(12) United States Patent
Imming et al.

(10) Patent No.: US 7,475,161 B2
(45) Date of Patent: Jan. 6, 2009

(54) IMPLEMENTING CONDITIONAL PACKET ALTERATIONS BASED ON TRANSMIT PORT

(75) Inventors: Kerry Christopher Imming, Rochester, MN (US); John David Irish, Rochester, MN (US); Tolga Ozguner, Rochester, MN (US); Andrew Henry Wottreng, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 822 days.

(21) Appl. No.: 10/655,054

(22) Filed: Sep. 4, 2003

(65) Prior Publication Data

US 2005/0055462 A1 Mar. 10, 2005

(51) Int. Cl.
*G06F 15/16* (2006.01)
*H04Q 11/00* (2006.01)

(52) U.S. Cl. .................................. 709/249; 370/395.63

(58) Field of Classification Search ................. 709/249, 709/230; 714/39; 370/252, 395.63
See application file for complete search history.

(56) References Cited

U.S. PATENT DOCUMENTS 6,163,541 A * 12/2000 Casey et al. ............ 370/395.51
6,263,393 B1 * 7/2001 Funaya et al. ............... 710/316
6,546,021 B1 * 4/2003 Slane ........................ 370/465
2004/0156368 A1 * 8/2004 Barri et al. ............. 370/395.63

OTHER PUBLICATIONS

List of TCP and UDP port numbers from Wikipedia encyclopedia (the IANA list of port assignments at www.iana.org/assignments/port-numbers).*
List of TCP and UDP port numbers from Wikipedia encyclopedia (the IANA list of port assignments at www.iana.org/assignments/port-numbers, accessed on Dec. 14, 2007).*

* cited by examiner

*Primary Examiner*—Joseph E Avellino
*Assistant Examiner*—Jeong S Park
(74) *Attorney, Agent, or Firm*—Joan Pennington

(57) ABSTRACT

A method, apparatus and computer program product are provided for implementing conditional packet alterations based upon a transmit port. A selection mechanism is provided for implementing packet alterations. A sequence of frame alteration instructions and transmit port numbers associated with a packet being transmitted is applied to the selection mechanism. The selection mechanism performs alterations on the packet being transmitted responsive to the applied sequence of frame alteration instructions and port numbers associated with the packet. The selection mechanism includes a multiplexer that sequentially receives frame alteration instructions and port numbers associated with a packet being transmitted, and an indirect data array for providing packet alteration data from the indirect data array.

4 Claims, 7 Drawing Sheets

INSTRUCTION FORMAT

INDIRECT DATA SRAM EXAMPLE DATA

400

| 0 | MAC ADDRESS FOR PORT 0 |
| 1 | MAC ADDRESS FOR PORT 1 |
| 2 | MAC ADDRESS FOR PORT 2 |
| 3 | * * * |

SELECTED DATA

IMPLEMENTING CONDITIONAL PACKET ALTERATIONS BASED ON TRANSMIT PORT

FIELD OF THE INVENTION

The present invention relates generally to the data processing field, and more particularly, relates to a method, apparatus and computer program product for implementing conditional packet alterations based upon a transmit port.

DESCRIPTION OF THE RELATED ART

In network processing, incoming packets will usually need to be altered prior to being transmitted out the correct port. Specifically, the header must be altered to conform to protocol requirements of the network to which the target port belongs. Frequently, these alterations may involve more than one layer of network protocol. For example, a transmitted packet may need both a new destination Internet Protocol (IP) address and a new destination Ethernet hardware or media access control (MAC) address.

There are also cases where a single incoming packet may need to be transmitted to multiple destination ports. These cases are known as multi-cast, or broadcast for packets sent to all destination ports. These multiple transmit ports may need packet processing that is specific to the target port. One example of this is a Virtual Local Area Network (VLAN), where some transmit ports may be part of a VLAN while others are not.

The only known solution to this problem involves separately processing the packet for each target port. A drawback to this solution is that additional processing is required for the multiple destinations. It also requires that the transmit port and transmit port type be known before the packet processing can be completed. It further requires that multiple copies of the incoming packet be created to contain the various packet versions required for transmit. These copies can either be created in packet memory, which is extremely undesirable since it consumes precious memory bandwidth, or the copies can be created by additional dedicated processing for each packet during transmit.

U.S. Pat. No. 6,546,021 to Albert Alfonse Slane, issued Apr. 8, 2003 and assigned to the present assignee, discloses a method and apparatus for user programmable packet to connection translation. When a data block is received, a protocol type for the received data block is identified based upon the media connection or port number for the received data block. A connection identification is formed utilizing a header of the received data block, responsive to the identified protocol type for the received data block. An instruction array is used with an arithmetic logic unit (ALU). A small nano-processor ALU executes simple RISC-like instructions. As cells arrive at the receive buffer, a nano-program is run based on a particular port for the received cell identified from the port register input. Different code sequences are loaded into the instruction array based upon the user configured protocol type for a media connection or port number of the received data block.

A need exists for an improved and effective mechanism in a network processor for implementing conditional packet alterations based upon a transmit port. It is desirable to provide such a mechanism that efficiently and effectively implements conditional packet alterations based upon a transmit port for a broadcast packet transmitted to multiple destination ports; and that provides increased transmit efficiency.

SUMMARY OF THE INVENTION

A principal object of the present invention is to provide a method, apparatus and computer program product for implementing conditional packet alterations based upon a transmit port. Other important objects of the present invention are to provide such method, apparatus and computer program product for implementing conditional packet alterations based upon a transmit port substantially without negative effect and that overcome many of the disadvantages of prior art arrangements.

In brief, a method, apparatus and computer program product are provided for implementing conditional packet alterations based upon a transmit port. A selection mechanism is provided for implementing packet alterations. A sequence of frame alteration instructions and transmit port numbers associated with a packet being transmitted is applied to the selection mechanism. The selection mechanism performs alterations on the packet being transmitted responsive to the applied sequence of frame alteration instructions and port numbers associated with the packet.

The selection mechanism includes a multiplexer that sequentially receives frame alteration instructions and port numbers associated with a packet being transmitted, and an indirect data array that stores packet alteration data. The multiplexer sequentially receives a multiplexer select input from sequential frame alteration instructions for selecting one of a select entry from the frame alteration instruction or the transmit port number. Selection logic generates a data array select input using a multiplexer output and a byte select from sequential frame alteration instructions. The data array select input is applied to the indirect data array for selecting packet alteration data from the indirect data array for the packet being transmitted.

In accordance with features of the invention, the frame alteration instructions include overlay indirect, insert indirect, copy indirect, and branch conditional instructions.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
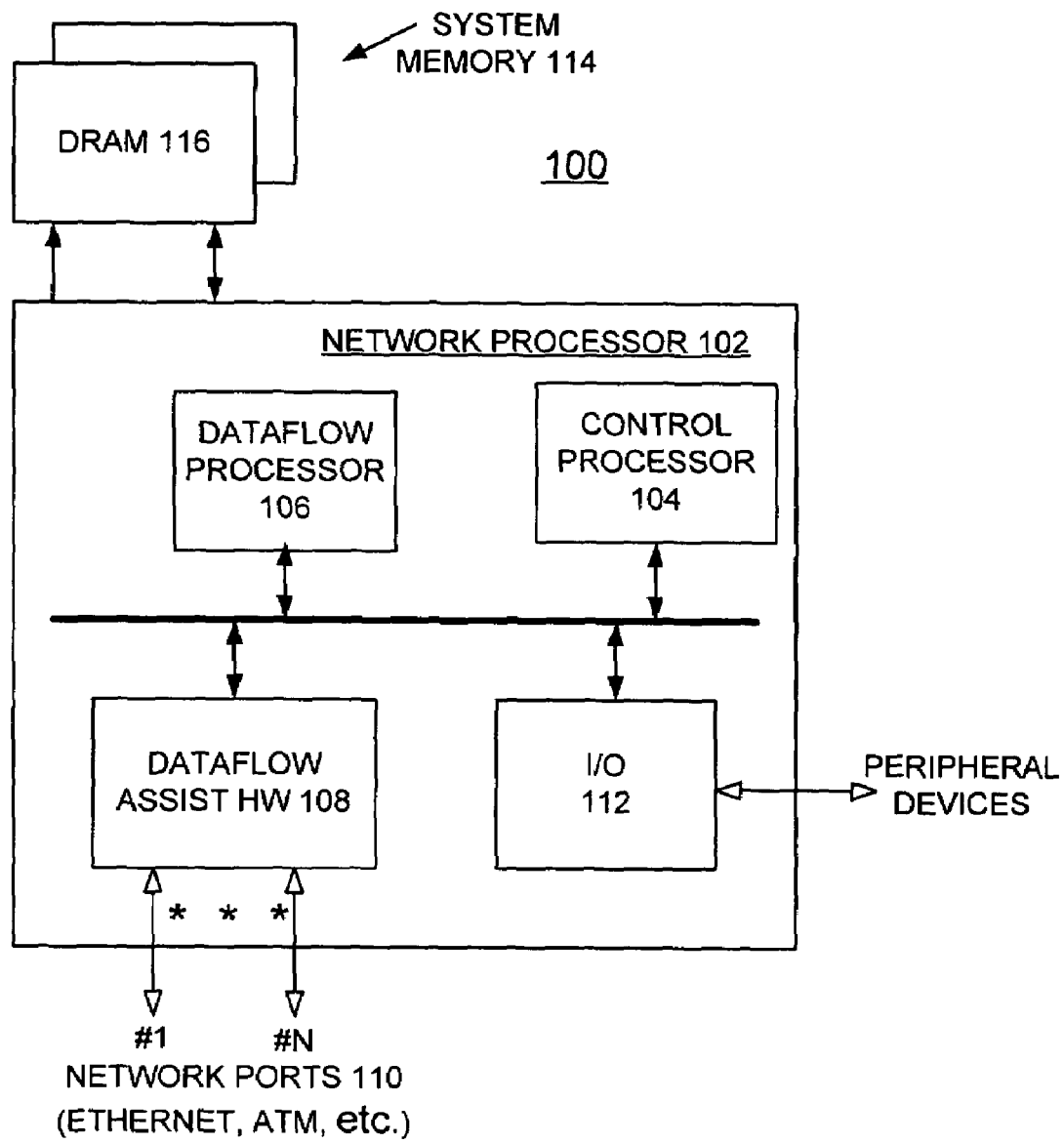
FIG. 1 is a block diagram representation illustrating a network processor system for implementing conditional packet alterations based upon a transmit port in accordance with the preferred embodiment.

Having reference now to the drawings, in FIG. 1, there is shown a network processor system generally designated by the reference character 100 for carrying out methods for implementing conditional packet alterations based upon a transmit port of the preferred embodiment. As shown in FIG. 1, network processor system 100 includes a network processor 102. Network processor system 100 includes a control processor 104, and a dataflow processor 106 coupled by a network processor bus to dataflow assist hardware (HW) 108 of the preferred embodiment. The dataflow assist hardware (HW) 108 of the preferred embodiment is coupled to multiple network ports #1-N 110 for communicating using known network protocols, such as, an Asynchronous Transfer Mode (ATM), Ethernet, and the like. Network processor system 100 includes an input/output (I/O) 112 coupled to peripheral devices. Network processor system 100 includes a system memory 114 including a dynamic random access memory (DRAM) 116.

Control processor 104 and dataflow processor 106 of network processor 102 can be implemented with various standard processors, for example, with one of the PowerPC® line of processors manufactured by International Business Machines Corporation.

In accordance with features of the preferred embodiment, a selection mechanism is provided that is based on the packet's destination port 110. Using this selection mechanism, a fixed sequence of commands can produce multiple results based on the port to which the packet is transmitted.

A key advantage of this selection mechanism is that a single packet, along with a single set of instructions that control the alterations, can be sent to multiple ports 110. As the packet is transmitted out each of these ports 110, the alterations customize the packet to match the requirements of the protocol on each respective port.

In accordance with features of the preferred embodiment, a select field is provided in a set of instructions that can access data in a data memory called the indirect data array. The instructions include overlay indirect, insert indirect, copy indirect, and branch conditional.

Figure 2:
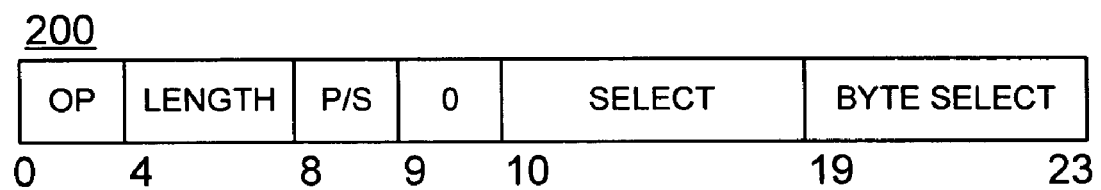
FIG. 2 is a diagram illustrating an instruction format in accordance with the preferred embodiment.

Referring now to FIG. 2, there is shown an instruction format generally designated by reference character 200 in accordance with the preferred embodiment. The instruction format 200 includes an op code field OP defining a particular operation, a length field defining length, for example, for packet alteration data to be inserted or replaced, a select field having two parts, an 11-bit entry select plus a 5-bit offset or byte select, as shown in the following TABLE 1.

TABLE 1

| P/S | Select (0:9) | Offset (0:4) |
|-----|--------------|--------------|

The high-order bit P/S of the entry select field is used as a flag. If the flag is a '0', the select field from the instruction is used to access an entry in an indirect data array, such as an indirect data static random access memory (SRAM) 400 illustrated and described with respect to FIG. 4. If the flag is set ('1'), the destination port is used in place of the Select (0:9)field to access an entry in the indirect array. Each entry in the indirect array is, for example, 32-bytes.

Figure 3:
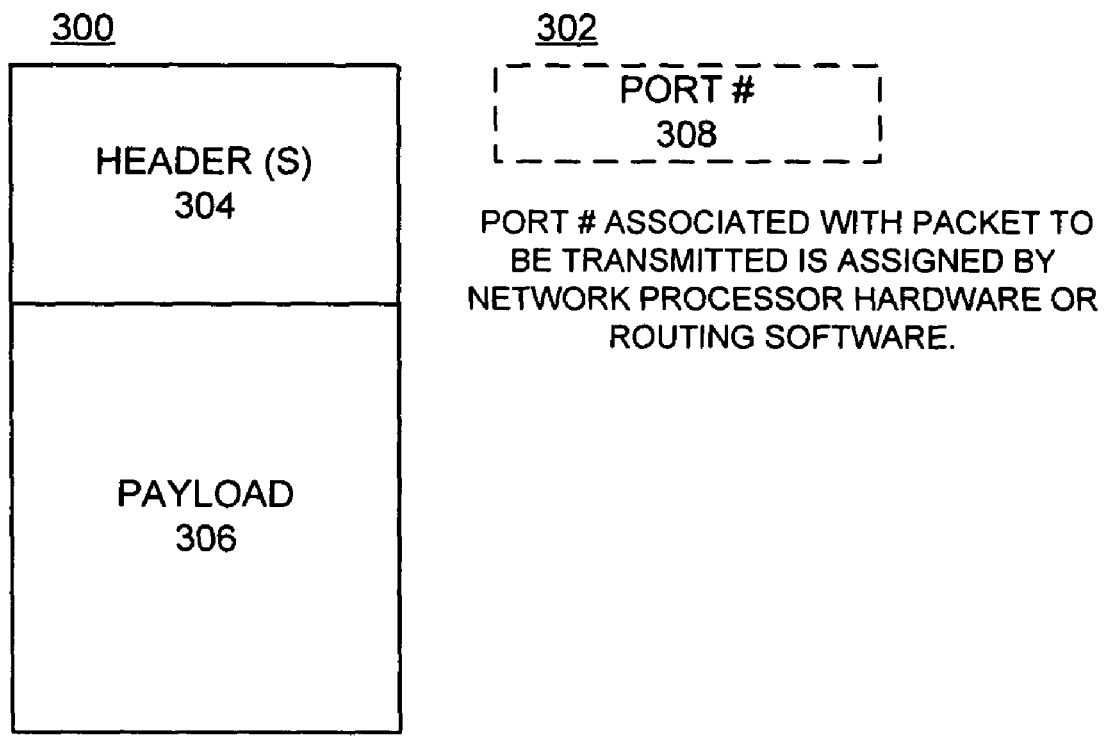
FIG. 3 is a diagram illustrating a received packet together with a transmit port number in accordance with the preferred embodiment.

FIG. 3 illustrates a received packet generally designated by reference character 300 together with a memory or register generally designated by reference character 302 storing an associated transmit port number in accordance with the preferred embodiment. The received packet includes one or more headers 304 and payload 306. A particular transmit port number 308 associated with the packet 300 to be transmitted is assigned by network processor hardware or routing software.

Figure 4:
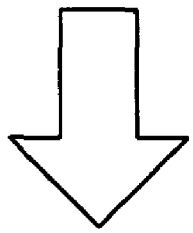
FIG. 4 is a diagram illustrating exemplary data of an indirect data array in accordance with the preferred embodiment.

FIG. 4 illustrates exemplary indirect data SRAM example data in an indirect data array generally designated by reference character 400 in accordance with the preferred embodiment. Indirect data SRAM example data 400 is implemented with an indirect data static random access memory (SRAM) 400. As shown in FIG. 4, the indirect data SRAM example data 400 stores multiple entries of Ethernet media access control (MAC) addresses for different transmit ports.

Figure 5:
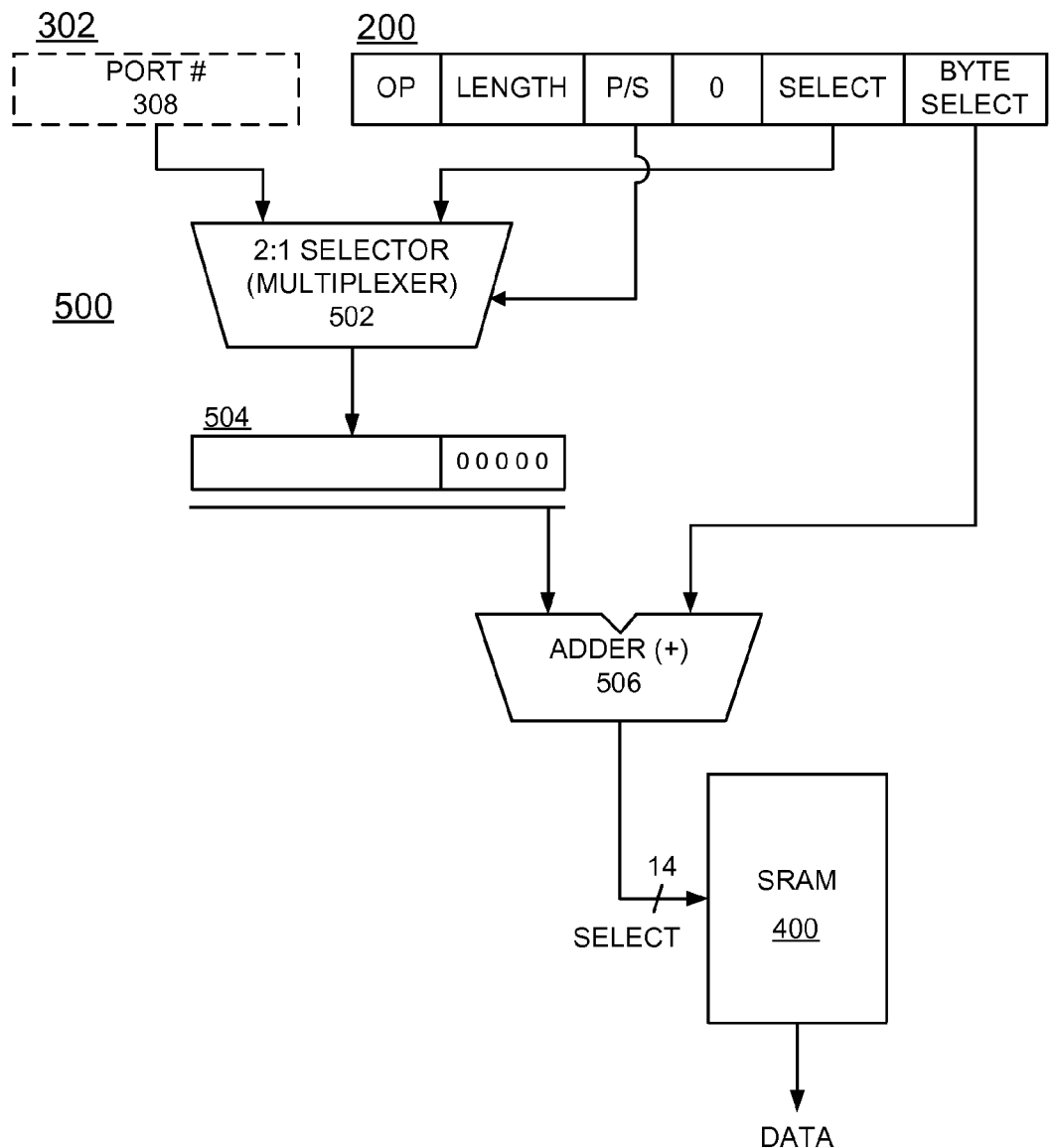
FIG. 5 is a schematic and block diagram illustrating a selection mechanism in accordance with the preferred embodiment.

FIG. 5 is a schematic and block diagram illustrating a selection mechanism generally designated by reference character 500 in accordance with the preferred embodiment. A sequence of one or more select entries of the frame alteration instructions 200 and port numbers 308 that is associated with a packet to be transmitted are coupled to a two-to-one (2:1) selector or multiplexer 502. The select field flag P/S is applied to a select input of the 2:1 selector 502 for selecting either the select entry of frame alteration instruction 200 or the port number 308. A sequence of one or more intermediate results 504 of processed outputs of the 2:1 selector 502 includes, for example, a select entry of frame alteration instruction 200 or a port number 308 with a number of zeros concatenated. The intermediate results and the byte select of frame alteration instruction 200 are sequentially added together by an adder 506. An output of adder 506 provides a select input to the indirect data SRAM 400 that provides a data output of selected packet alteration data for the packet being transmitted.

Figure 6:
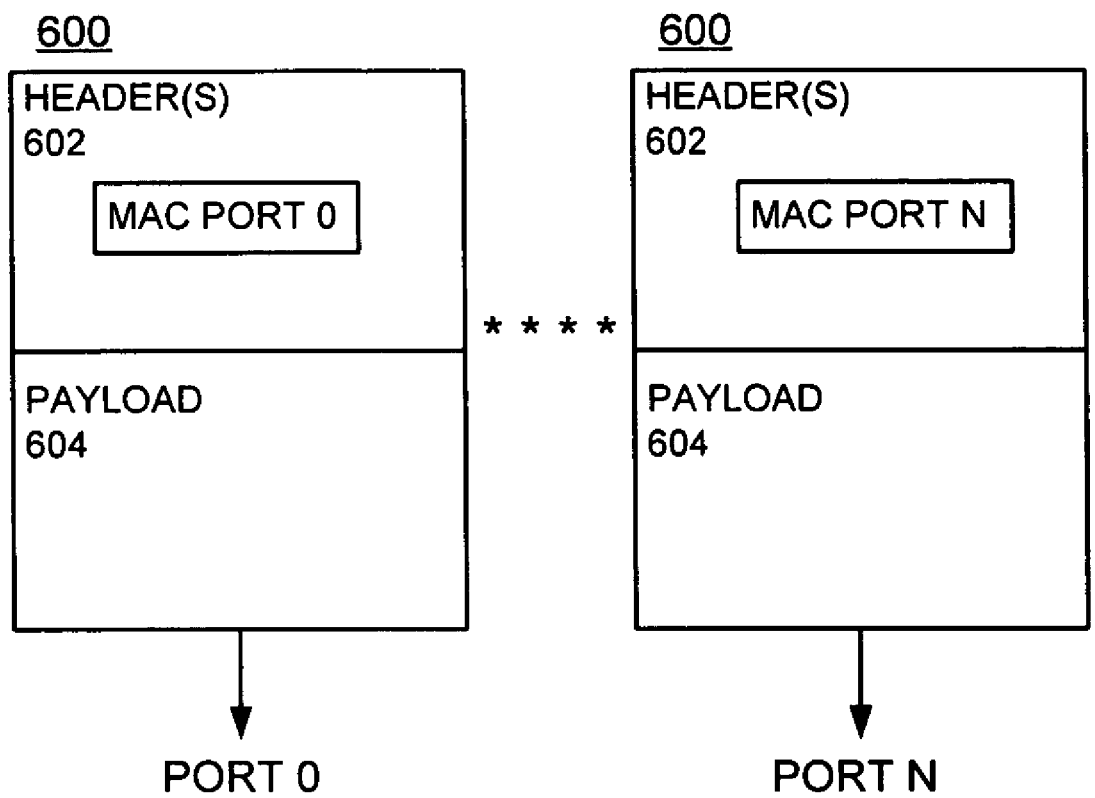
FIG. 6 is a diagram illustrating resulting transmitted packets in accordance with the preferred embodiment.

FIG. 6 is a diagram illustrating resulting transmitted packets, each generally designated by reference character 600 in accordance with the preferred embodiment. A packet header or headers 602 includes an inserted Ethernet MAC address for each port in accordance with a defined instruction sequence. The packet header or headers 602 is followed by packet data 604.

For example, packet headers 602 are generated using the indirect data array 400 loaded with a 6-byte Ethernet MAC address for each port as illustrated in FIG. 4, with the entry select number P/S of 1 applied to multiplexer 502 corresponding to the port number 308. The alterations during transmit select the address corresponding to the transmit port 110 from indirect data array 400 and overlay the old MAC address in the packet header 602.

The insert indirect instruction, inserts from 1 to 16 bytes as indicated by the 4-bit length field of frame alteration instructions 200 starting at current pointer within the current packet. The current pointer is a register value that indicates an offset in the current packet and indicates a point at which frame alterations are applied. This pointer is advanced explicitly or implicitly by a frame alteration instruction. The data is obtained by using the Select and Byte Select fields to determine the data location in the indirect data array 400. Data in the indirect array 400 is under software control. Data already existing in the packet is shifted to the right from the point of insertion by the number of bytes being inserted. This command can add up to 16 bytes to a packet. Data selected for insertion must not cross a 16-byte boundary. Therefore, for a 16-byte insertion, the four low-order byte_select bits must be zero.

Copending U.S. patent application Ser. No. 10/427,865 filed May 1, 2003, by Paul Allen Ganfield, Kent Harold Haselhorst, Kerry Christopher Imming, and John David Irish, and entitled "METHOD AND APPARATUS FOR IMPLEMENTING PACKET COMMAND INSTRUCTIONS FOR NETWORK PROCESSING" discloses method and apparatus for implementing packet command instructions for network processing that includes a set of packet commands, each packet command defining a corresponding packet operation. The subject matter of the above-identified patent application is incorporated herein by reference.

Another example is a configuration where some ports 110 are enabled for VLAN and some are not. A bit is set in the indirect data SRAM 400 for each port to indicate whether it is VLAN enabled or not. The port-based selection is then used as a test in a conditional branch instruction to perform one of two alterations based on whether the VLAN tags should be inserted into the packet header 602.

This type of port-based data selection in accordance with the preferred embodiment enables many alterations that otherwise are simply not possible. Especially alterations involved in multi-casting a packet to a set of transmit ports 110. With this invention, the sequence of frame alteration instructions that is associated with the packet is transmitted with the packet to the frame alteration hardware, and the frame alteration hardware, selection mechanism 500 performs the port-based alteration. The frame alteration hardware, selection mechanism 500 handles the conditional alterations based on the destination port.

Transmit efficiency is increased by this invention, especially when packets are scheduled, for example, with traffic shaping. Scheduling can cause packets in a broadcast or multi-cast group to be transmitted over a long window of time. Port congestion on selected ports can have the same effect. Without this invention the packet would have to be examined and altered at each of the various, and potentially widespread, transmit times.

Figure 7:
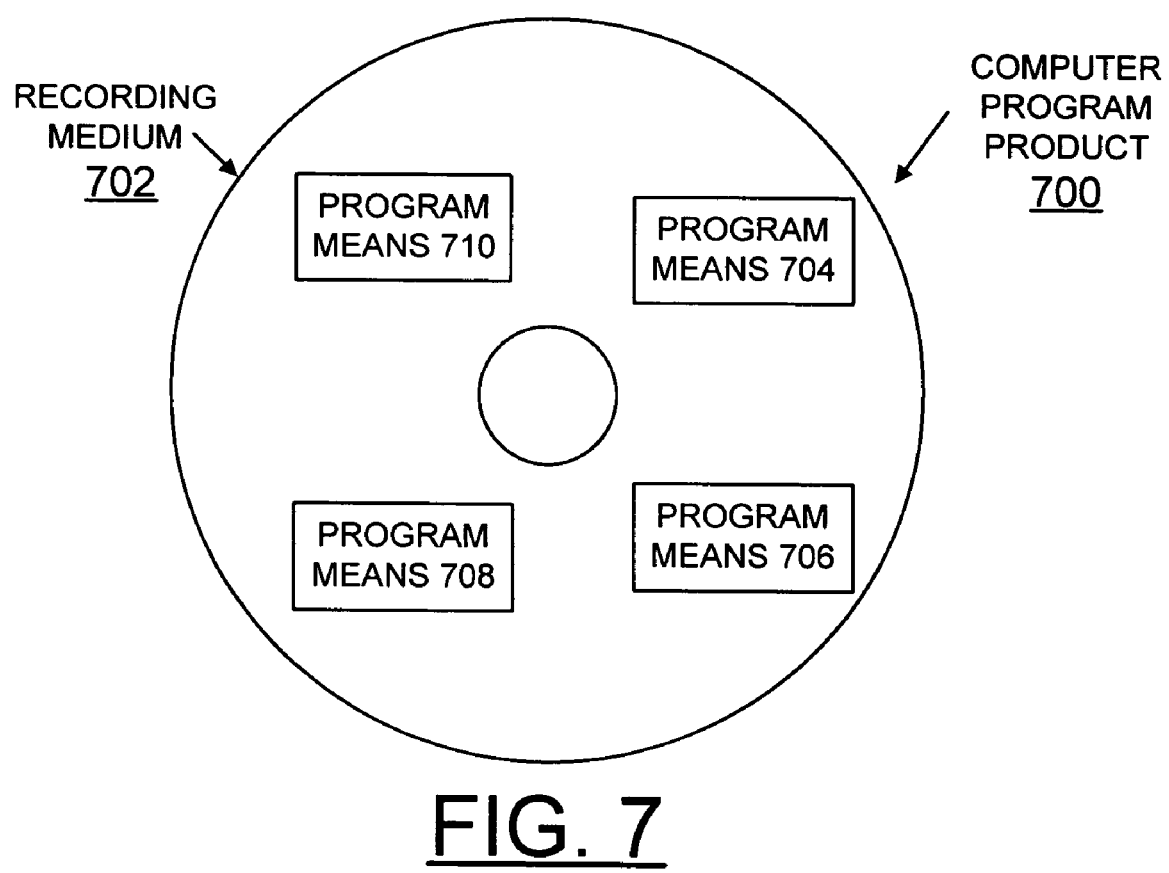
FIG. 7 is a block diagram illustrating a computer program product in accordance with the preferred embodiment.

Referring now to FIG. 7, an article of manufacture or a computer program product 700 of the invention is illustrated. The computer program product 700 includes a recording medium 702, such as, a floppy disk, a high capacity read only memory in the form of an optically read compact disk or CD-ROM, a tape, a transmission type media such as a digital or analog communications link, or a similar computer program product. Recording medium 702 stores program means 704, 706, 708, 710 on the medium 702 for carrying out the methods for implementing conditional packet alterations based upon a transmit port of the preferred embodiment in the network processor system 100 of FIG. 1.

A sequence of program instructions or a logical assembly of one or more interrelated modules defined by the recorded program means 704, 706, 708, 710, direct the network processor system 100 for implementing conditional packet alterations based upon a transmit port of the preferred embodiment.

While the present invention has been described with reference to the details of the embodiments of the invention shown in the drawing, these details are not intended to limit the scope of the invention as claimed in the appended claims.

What is claimed is:

1. A method for implementing conditional packet alterations based upon a transmit port comprising the steps of:
providing a selection mechanism for implementing the packet alterations;
providing a hardware multiplexer, and an indirect data array for storing packet alteration data to implement said selection mechanism for implementing packet alterations;
sequentially applying one or more select entries of a sequence of frame alteration instructions and a plurality of transmit port numbers associated with a packet being transmitted to said selection mechanism; said sequence of said frame alteration instructions and said port numbers associated with said packet being transmitted applied to said hardware multiplexer of said selection mechanism including applying a fixed sequence of said frame alteration instructions including at least one of an overlay indirect instruction, an insert indirect instruction, a copy indirect instruction, and a branch conditional instruction; and providing said frame alteration instructions having a predefined instruction format including a select field including a select flag, an entry select; and a byte select;
performing the alterations on said packet being transmitted responsive to said sequentially applied one or more select entries of said sequence of said frame alteration instructions and said plurality of said transmit port numbers associated with said packet being transmitted; and
transmitting said packet from each respective transmit port for said plurality of said transmit port numbers, responsive to performing the alterations.

2. The method for implementing conditional packet alterations based upon said transmit port as recited in claim 1 wherein the step of providing said frame alteration instructions with said predefined instruction format includes the step of applying said select flag to a multiplexer select input for selecting said entry select from the frame alteration instruction or said transmit port number with said multiplexer.

3. The method for implementing conditional packet alterations based upon said transmit port as recited in claim 2 includes the step of generating a data array select input using a multiplexer selection; said data array select input being applied to the indirect data array for selecting packet alteration data from the indirect data array for the packet being transmitted.

4. The method for implementing conditional packet alterations based upon said transmit port as recited in claim 3 wherein the step of generating said data array select input includes the step of combining said multiplexer selection with said byte select for selecting a starting byte of said packet alteration data from the indirect data array for the packet being transmitted.

* * * * *